(12) United States Patent
Yegin et al.

(10) Patent No.: US 7,659,812 B2
(45) Date of Patent: Feb. 9, 2010

(54) TIRE PRESSURE MONITOR WITH DIVERSITY ANTENNA SYSTEM AND METHOD

(75) Inventors: Korkut Yegin, Grand Blanc, MI (US); Nazar F. Bally, Sterling Heights, MI (US); Randall J. Snoeyink, Clarkson, MI (US); William R. Livengood, Grand Blanc, MI (US); Jon P. Gleeson, Lapeer, MI (US); Randall J. Robson, Lapeer, MI (US)

(73) Assignee: Delphi Technologies, Inc., Troy, MI (US)

( * ) Notice: Subject to any disclaimer, the term of this patent is extended or adjusted under 35 U.S.C. 154(b) by 632 days.

(21) Appl. No.: 11/373,854

(22) Filed: Mar. 10, 2006

(65) Prior Publication Data

US 2006/0222120 A1    Oct. 5, 2006

Related U.S. Application Data

(60) Provisional application No. 60/660,516, filed on Mar. 10, 2005.

(51) Int. Cl.
*B60C 23/00* (2006.01)

(52) U.S. Cl. .................. 340/447; 340/442; 375/317; 343/711; 343/713

(58) Field of Classification Search ......... 340/442–447, 340/505, 500; 73/146, 146.5; 343/711, 713
See application file for complete search history.

(56) References Cited

U.S. PATENT DOCUMENTS

| | | | | |
|---|---|---|---|---|
| 5,414,470 A | * | 5/1995 | Hotta et al. ................ 348/530 |
| 5,517,686 A | * | 5/1996 | Kennedy et al. ............ 455/273 |
| 5,999,138 A | * | 12/1999 | Ponce de Leon ............ 343/745 |
| 6,112,585 A | * | 9/2000 | Schrottle et al. ............. 73/146 |
| 6,181,241 B1 | * | 1/2001 | Normann et al. ............ 340/447 |
| 6,191,746 B1 | | 2/2001 | Nagy ........................ 343/713 |
| 6,501,372 B2 | * | 12/2002 | Lin ............................ 340/442 |
| 6,630,885 B2 | * | 10/2003 | Hardman et al. ............ 340/505 |
| 6,809,692 B2 | | 10/2004 | Puente Baliarda et al. .. 343/713 |
| 6,861,991 B2 | * | 3/2005 | Mueller et al. .............. 343/713 |
| 6,897,770 B2 | * | 5/2005 | Lill ............................ 340/445 |
| 6,917,794 B2 | | 7/2005 | Marrah et al. ............ 455/276.1 |
| 7,002,456 B2 | | 2/2006 | Lin ............................ 340/447 |
| 7,149,480 B2 | * | 12/2006 | Miyahara ..................... 455/78 |
| 7,411,487 B2 | * | 8/2008 | Takao et al. ................. 340/442 |
| 7,482,921 B2 | * | 1/2009 | Froitzheim et al. ..... 340/539.21 |
| 2003/0053412 A1 | * | 3/2003 | Yoshida et al. ............. 370/208 |
| 2005/0259016 A1 | | 11/2005 | Yegin et al. ................. 343/725 |

* cited by examiner

*Primary Examiner*—Eric M Blount
(74) *Attorney, Agent, or Firm*—Jimmy L. Funke (57) ABSTRACT

An automotive tire pressure monitor with diversity antenna system employs a RF transmitter within each wheel/tire assembly and a vehicle mounted receiver with multiple receiving antennas. A first, primary antenna is located adjacent one vehicle window and a secondary antenna is located adjacent another vehicle window opposite the primary antenna. Both antennas are coupled to a receiver via a switch. The receiver feeds a processor, which is encoded to select the optimal antenna/receiver configuration based upon absolute signal strength (signal to noise), signal quality (completeness of encoded data) or signal reception rate. The signal received from the optimized antenna/receiver configuration is processed and transmitted to the host vehicle for system intervention and or display to an operator.

23 Claims, 8 Drawing Sheets

TIRE PRESSURE MONITOR WITH DIVERSITY ANTENNA SYSTEM AND METHOD

RELATED PATENT APPLICATIONS

This application claims priority to U.S. provisional patent application Ser. No. 60/660,516 filed Mar. 10, 2005, entitled "Diversity Tire Pressure Monitoring System and Method".

TECHNICAL FIELD

The disclosure generally relates to diversity antenna systems. More specifically, the disclosure relates to a multi-band diversity antenna system applied to automotive tire pressure monitoring systems.

BACKGROUND OF THE INVENTION

In response to regulations implemented by the United States government, automotive manufacturers are starting to provide new vehicles with tire pressure monitor/monitoring (TPM) equipment. Initiated in the year 2000, Congress passed the Transportation Recall Enhancement, Accountability, and Documentation (TREAD) Act, which related to issues concerned with the operation of a vehicle with substantially under-inflated tires. Under-inflated tires can result in a tire separation/blowout, which adds to the potential for a loss of control of a vehicle. Additionally, under-inflated tires shorten tire life and increase fuel consumption.

Section 12 of the TREAD Act directed the Department of Transportation (DOT) to complete a rule requiring that new motor vehicles must include a warning system that indicates if tires are under-inflated. Ever further, in response to Section 12 of the TREAD Act, the National Highway Traffic Safety Administration's (NHTSA) National Center for Statistics and Analysis (NCSA) conducted the Tire Pressure Special Study (TPSS), which was designed to assess to what extent passenger vehicle operators are aware of the recommend tire pressures for their vehicles, the frequency and the means they use to measure their tire pressure, and how significantly the actual measured tire pressure differs from the manufacturers recommend tire pressure.

As a result of the TPSS, NHTSA favored a direct system using monitors in each wheel to determine whether tires are properly inflated so as to alert drivers when tire pressure is low. In early 2002, NHTSA issued a regulation mandating the implementation of TPM systems in new vehicles beginning with the 2004 model year. Under that rule, TPMs had to warn motorists when tire pressure fell 25% or 30% below the vehicle manufacturer's recommended level. The new standard applies to passenger cars, trucks, multipurpose passenger vehicles, and buses with a gross vehicle weight rating of 10,000 pounds or less, except those vehicles with dual wheels on an axle.

TPMs have been implemented in two ways: using the vehicle's antilock brake sensors in an indirect approach, or, by installing TPM sensors inside the tires prior to inflation on the wheel rim in a direct approach. Although the cost of the direct approach is higher than that of the indirect approach, it is preferred due to its precision and reliability. In a conventional operating environment, the signals transmitted from sensors inside tires to a receiving antenna often exhibit poor reception characteristics due to an interaction of the signals with the vehicle body, road, nearby vehicles, other nearby objects, and the like. The poor reception characteristics of the antenna often result in the triggering of a failure mode for the microprocessor unit.

In most cases, the receiving antenna is typically a remote keyless entry (RKE) antenna that receives signals from all of the vehicle's tires, which is then subsequently passed to a microprocessor for information processing. The RKE antenna is traditionally chosen for TPM due to its frequency range and relatively low cost and easy installation characteristics. Because the RKE antenna is a single antenna that is typically installed on one of the side windows or back-windshield glass, the RKE antenna alone may not be sufficient for some situations to receive the tire pressure signals propagated through an electromagnetically harsh environment, which has, for some applications, effected the reception capability of the most distant tire pressure sensor relative the position of the RKE receiving antenna.

These and other features and advantages of this invention will become apparent upon reading the following specification, which, along with the drawings, describes preferred and alternative embodiments of the invention in detail.

SUMMARY OF THE INVENTION

Generally, the present invention fulfills the forgoing needs by providing, in one aspect thereof, a tire pressure monitor system employing separate transmitters in each wheel/tire assemble of a host vehicle and further incorporating a diversity antenna system in the vehicle body mounted receiver.

According to one aspect of the invention, the automotive tire pressure monitoring system includes means for periodically receiving separate tire condition signals from each transmitter. The signals are received by two or more spaced antennas fixedly disposed on the host vehicle. Furthermore, means are provided for ranking the received signals as a function of predetermined criteria and thereafter generating an output signal indicative of a tire condition as a function of the highest ranked signal. Finally, the system transmits an output signal to the host vehicle. This arrangement has the capability to receive and decode both remote keyless entry and remote tire pressure sensor transmissions with the same hardware.

In one embodiment of the invention, the automotive tire pressure monitoring system comprises a primary antenna which is disposed adjacent a vehicle window and a second antenna disposed adjacent a vehicle window distal said primary antenna. The antennas are selectively coupled to a receiver by a switch. The receiver is coupled with a microprocessor including a memory subsystem which stores code that, when executed by the processor, instructs the processor to perform the steps of: (1.) connecting the primary antenna to the receiver, (2.) detecting and measuring the strength of a message signal indicative of a vehicle tire condition, such as inflation level, received by the primary antenna, (3.) calculating the signal to noise ratio for the primary antenna, (4.) connecting the secondary antenna to the receiver, (5.) detecting and measuring the strength of a message signal indicative of a vehicle tire condition received by the secondary antenna, (6.) calculating the signal to noise ratio for the secondary antenna, (7.) comparing the primary antenna signal to noise ratio with the secondary antenna signal to noise ratio, (8.) connecting the antenna with the highest signal to noise ratio to the receiver, (9.) processing the received signal, (10.) and generating an output signal as a function of information contained in the received signal.

According to another embodiment of the invention, the criteria for ranking the received signals comprises receiving, decoding, storing and comparing informationally complete signals received from each antenna. In this embodiment, dedicated separate receivers can be employed.

According to yet another embodiment of the invention, the criteria for ranking the received signals comprises the rate of reception of successive signals associated with each antenna.

BRIEF DESCRIPTION OF THE DRAWINGS

The present invention will now be described, by way of example, with reference to the accompanying drawings, in which.

Although the drawings represent embodiments of the present invention, the drawings are not necessarily to scale and certain features may be exaggerated in order to better illustrate and explain the present invention. The exemplification set forth herein illustrates an embodiment of the invention, in one form, and such exemplifications are not to be construed as limiting the scope of the invention in any manner.

DESCRIPTION OF THE PREFERRED AND ALTERNATIVE EMBODIMENTS OF THE INVENTION

The present invention is intended for application in varied automotive applications, particularly for tire pressure monitoring systems for passenger automobiles, and will be described in that context. It is to be understood, however, that the present invention could be successfully applied in many other applications. Accordingly, the claims herein should not be deemed limited to the specifics of the preferred and alternative embodiments of the invention described hereunder.

Figure 1A:
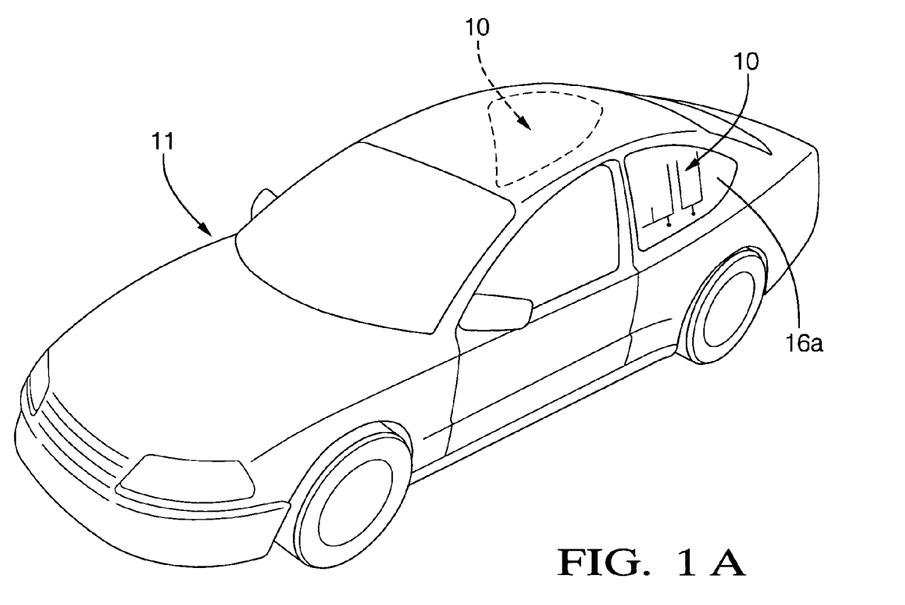
FIG. 1A, is a front perspective view of the driver's side of a left hand drive vehicle including a portion of a diversity antenna system employed in the tire pressure monitoring system of the present invention.
Figure 1B:
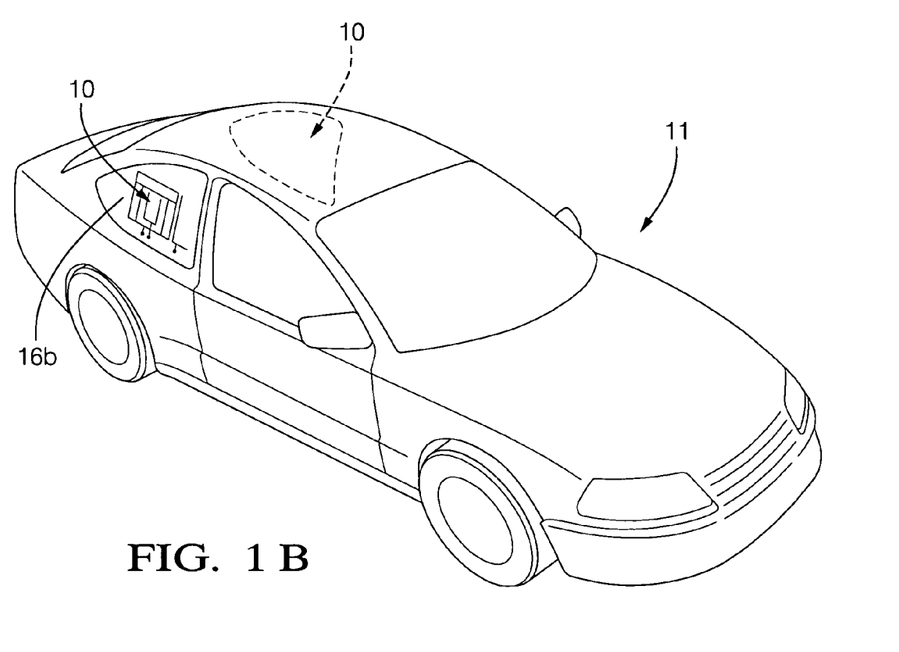
FIG. 1B, is a front perspective view of the passenger's side of the vehicle of FIG. 1A, including another portion of the diversity antenna system employed in the tire pressure monitoring system of the present invention.
Figure 2:
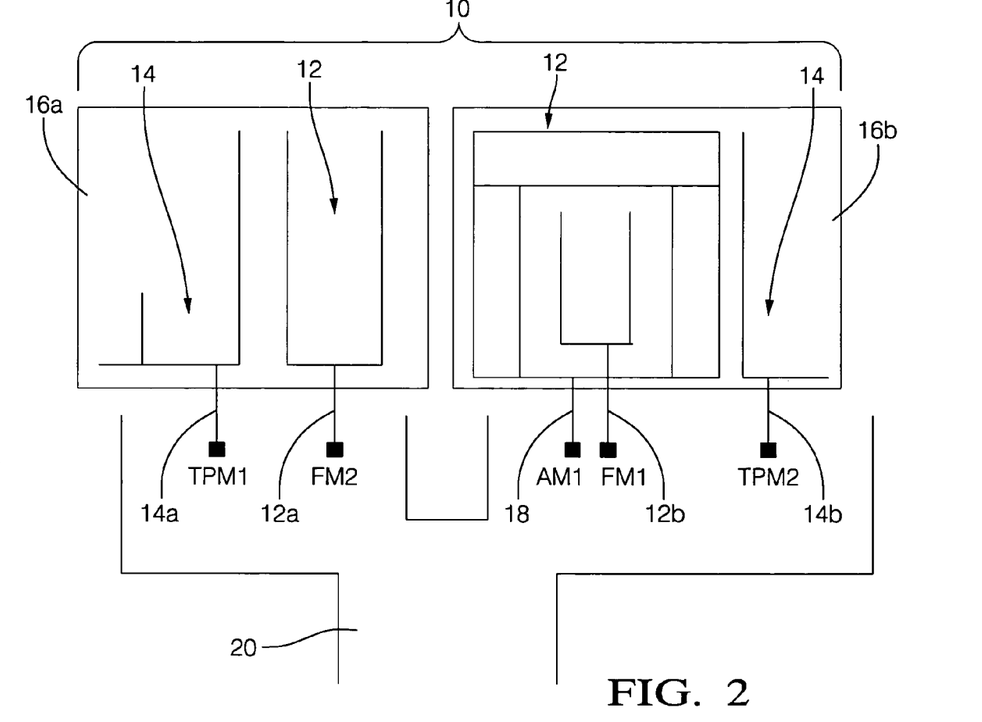
FIG. 2, is a composite schematic diagram of both portions of the diversity antenna system employed with the vehicle of FIGS. 1A and 1B, as part of the tire pressure monitoring system according to an embodiment of the present invention.

A multi-band diversity antenna system is shown generally at 10 in FIGS. 1A, 1B and 2 employed within a motor vehicle 11. The multi-band diversity antenna system 10 overcomes signal quality degradation associated with the reception of TPM signals by conventional antennas. Referring to FIG. 2, the multi-band diversity antenna system 10 utilizes a primary diversity antenna structure 12 and a secondary diversity antenna structure 14. The secondary diversity antenna structure 14 receives the TPM signals on a predetermined frequency band such as 433 MHZ, 315 MHz or others. The primary diversity antenna structure 12 may receive signals propagated over any desirable frequency band, such as, for example, the 88.1-107.9 MHz frequency band (i.e., the FM band).

Each of the primary and secondary diversity antenna structures 12, 14 include first output nodes 12a, 14a and second output nodes 12b, 14b. The first output nodes 12a, 14a are associated with a first side glass 16a, and the second output nodes 12b, 14b are associated with a second side glass 16b. The primary diversity antenna 12 associated with the second side glass 16b also includes an AM output node 18 for receiving signals on the 540-1700 kHz frequency band if the vehicle operator switches from FM signal reception to AM signal reception. As illustrated, the output from each node 12a, 12b, 14a, 14c, 18 is transmitted over a common coaxial cable 20 to reduce wiring.

According to an embodiment, the multi-band diversity antenna structure 10 is used for reception of the TPM signals, RKE signals and AM/FM signals. When the secondary diversity antenna structure 14 is used for monitoring tire pressure, the secondary diversity antenna structure 14 becomes concentric or separate from the primary diversity antenna structure 12 that may or may not be receiving AM/FM signals. Accordingly, the two diversity antenna structures 12, 14 permit reception of TPM and AM/FM signals at the same time.

Figure 3:
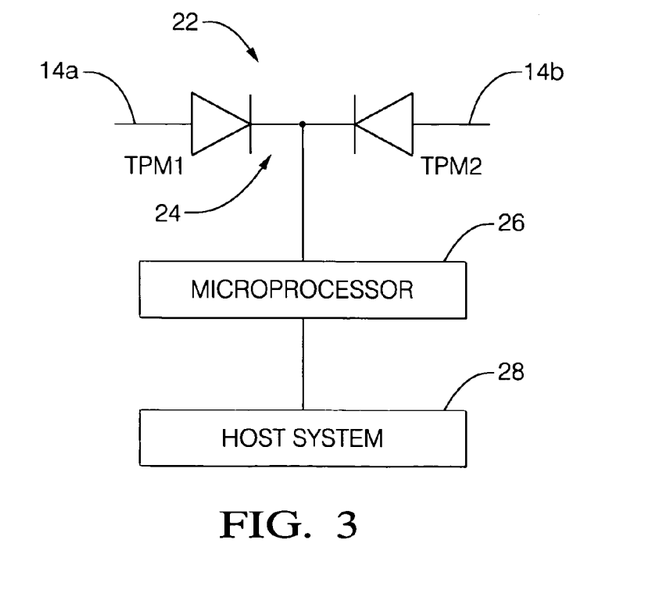
FIG. 3, is a schematic diagram of a switching circuit of the diversity antenna system of FIGS. 1A and 1B, for interconnecting the antenna portions with a system microprocessor, according to one embodiment of the invention.

Referring to FIG. 3, the output nodes 14a, 14b that are related to the TPM diversity antenna structure 14 are connected to a switching circuit 22, and the output of the switching circuit 22 is connected to a microprocessor unit 26 at node 24. The received TPM signals provided by each output node 14a, 14b are combined through a phase-locked-loop system to provide a phase diversity TPM antenna. The phase diversity system operates on the principle that two signals are fed into the microprocessor 26, and then, the microprocessor 26 decides which of the two received signals to use. The microprocessor 26 ultimately outputs an output signal to a host system 28, which triggers an alarm or otherwise informs a vehicle operator of the condition of the various vehicle tires. Because the received AM/FM signals and received TPM signals are transmitted on a common coaxial cable 20, signal isolation is achieved with band-pass filters. The switching algorithm is determined by the microprocessor 26, which should have enough memory and extra bus lines to accommodate two received TPM signals from each output node 14a, 14b at the same time.

Figure 4:
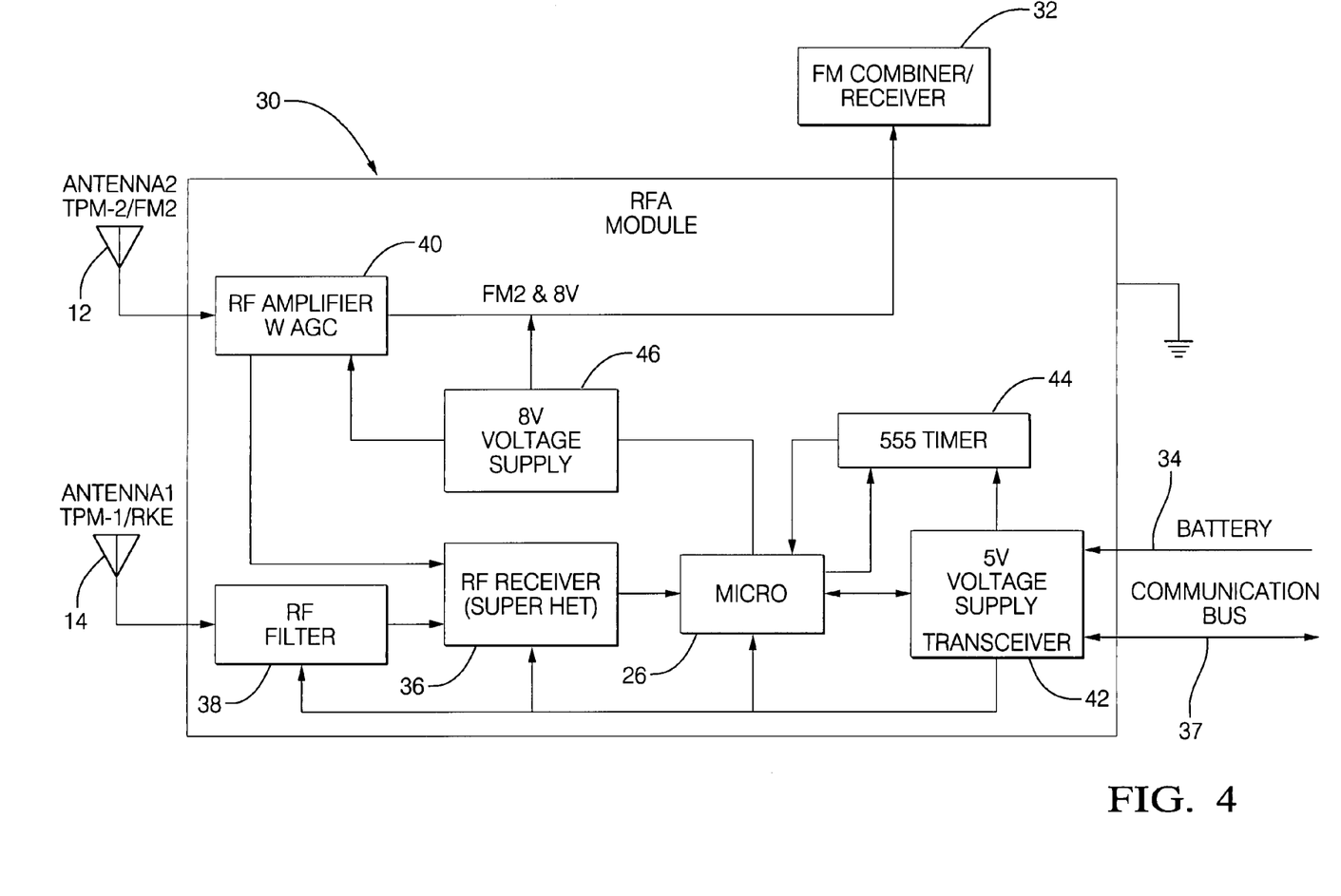
FIG. 4, is a schematic view of the system mechanization the presently inventive tire pressure monitor with diversity antenna system implemented with remote keyless entry and FM radio systems.

FIG. 4 presents a system block diagram schematic of one embodiment of the invention. Primary and secondary diversity antenna structures 12 and 14 feed an RFA module 30, which is also interconnected to an FM Combiner/Receiver 32, chassis ground, and various host vehicle systems via a battery supply lead 34 and a communication bus 36. Combined TPM and RKE diversity antenna structure 14 feeds an RF superhetrodyne receiver 36 through an RF filter 38. Combined TPM and FM diversity antenna structures 12 also feeds receiver 36 through a second RF amplifier with automatic gain control (AGC). RF receiver 36 feeds the microprocessor 26 which in interconnected with communication bus 36 through a 5V voltage supply/transceiver 42. Microprocessor 26 and voltage supply/transceiver 42 feed a type 555 timer 44, which drives the microprocessor 26. The microprocessor 26 also drives an 8V voltage supply 46, which feeds the RF amplifier 40 and FM combiner/receiver 32. It is to be noted that, if two receiver chips are employed, no external switching is required between the sources.

Figure 5:
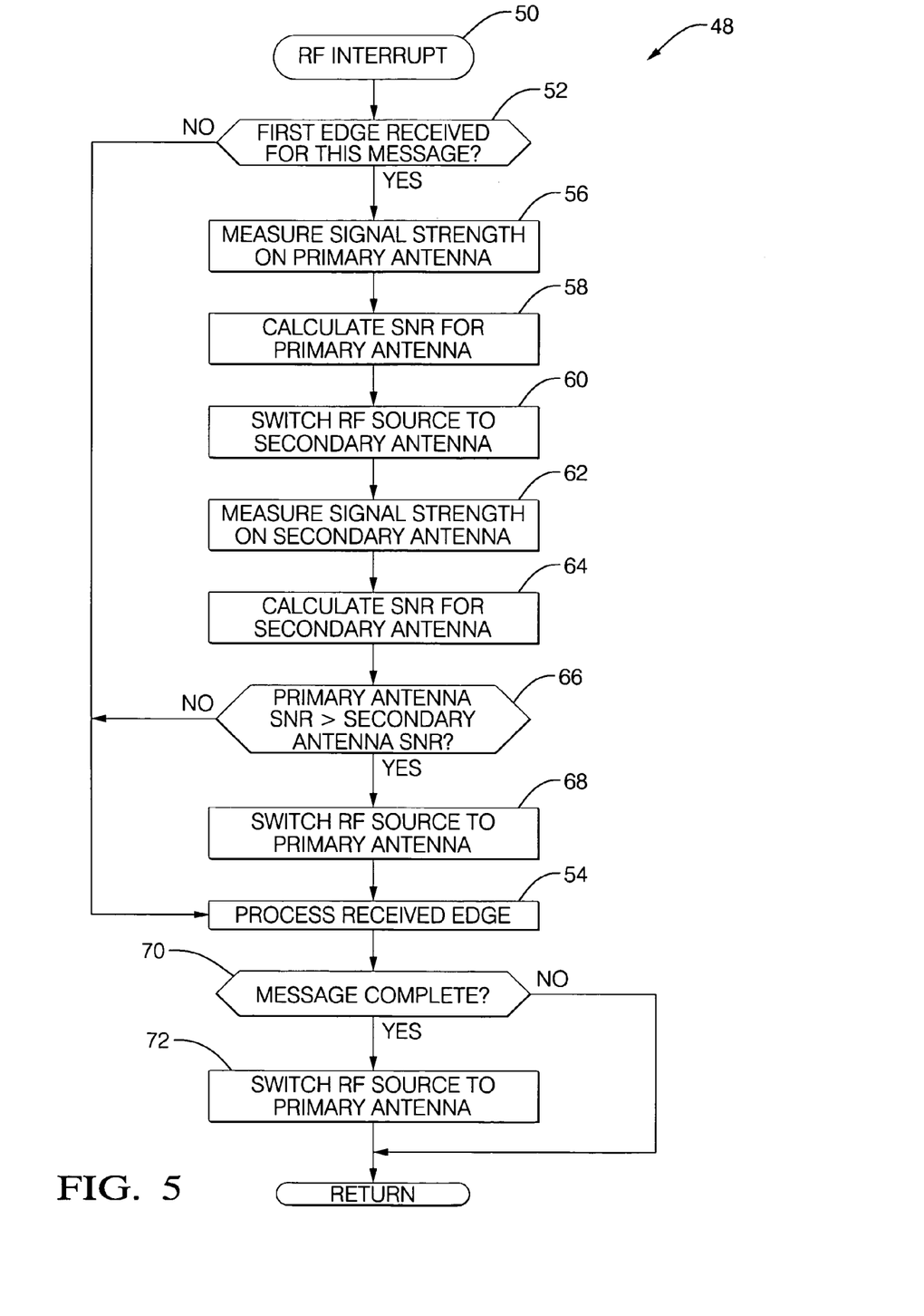
FIG. 5, is a flow diagram of a portion of the control circuit for measuring signal strength and comparing signal to noise ratios for optimal antenna selection according to one embodiment of the invention.
Figure 6:
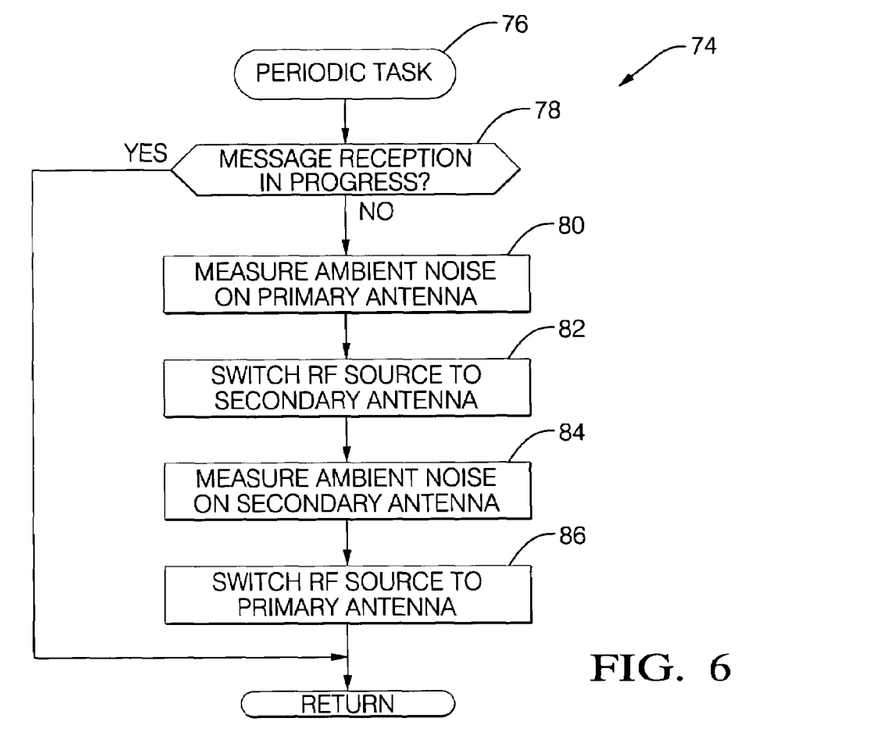
FIG. 6, is a flow diagram of a portion of the control circuit for measuring ambient noise for optimal antenna selection according to the embodiment of the invention of FIG. 5.

Referring to FIGS. 5 and 6, the control logic of the preferred embodiment of the present invention is illustrated in flow chart form, in which optimum antenna selection is based upon relative signal strength. FIG. 5 illustrates a routine 48, which is initiated in an RF interrupt step 50. A decision step ascertains whether the first edge has been received as part of the TPM tire condition message received from one or more wheel based transmitters. If the first edge has not been received, control transfers to a step 54 wherein the received edge of the next signal is processed. Otherwise, control transfers to a step 56 in which the signal strength of the signal as received via the primary antenna is measured. Thereafter the signal to noise ratio (SNR) for the primary antenna is calculated in step 58. The RF source is then switched to the secondary antenna in step 60 and the signal strength of the signal as received via the secondary antenna is measured in step 62. The SNR for the secondary antenna is calculated in step 64. Calculated primary antenna SNR is then compared with secondary antenna SNR in decision step 66. If the primary antenna SNR is greater that the secondary antenna SNR, control transfers to step 68, wherein the RF source is switched back to the primary antenna. Otherwise, if the secondary antenna SNR exceeds the primary antenna SNR, control is returned directly to step 54. Once the received edge of a new signal is processed, control is transferred to decision step 70 to determine if the received message is complete. If yes, the RF source is switched (or remains) to the primary antenna at step 72. Otherwise, an RF interrupt is anticipated at step 50, completing routine 48.

Referring to FIG. 6, a routine 74 monitors ambient noise for each antenna on an ongoing basis whenever a tire condition message is not being received. The routine 74 begins at step 76 where the task in initiated and transferred to a decision step 78, which ascertains if a message is being received. If yes, the routine is immediately restarted by returning control to step 76. If no, control is transferred to step 80 in which ambient noise on the primary antenna is measured. Thereafter, the RF source is switched to the secondary antenna at step 82. Next, in step 84, ambient noise on the secondary antenna is measured. Finally, the RF source is switched back to the primary antenna at step 86 and the routine 74 is repeated.

The preferred embodiment of the invention is one of three diversity algorithms described herein. The preferred method is also called the signal strength method. This method evaluates the signal strength of the signal on the first data bit that it receives and determines which antenna to use based on signal strength. Once a determination is made, it remains with that antenna until the entire message is received.

It may be possible to switch back and forth between antennas as the data is received but that would potentially introduce transients that would have to be accommodated.

This method is the most responsive and was targeted to the problem wherein some wheel positions would respond better to different antenna positions. This allows the antenna selection to change for each wheel.

Figure 7:
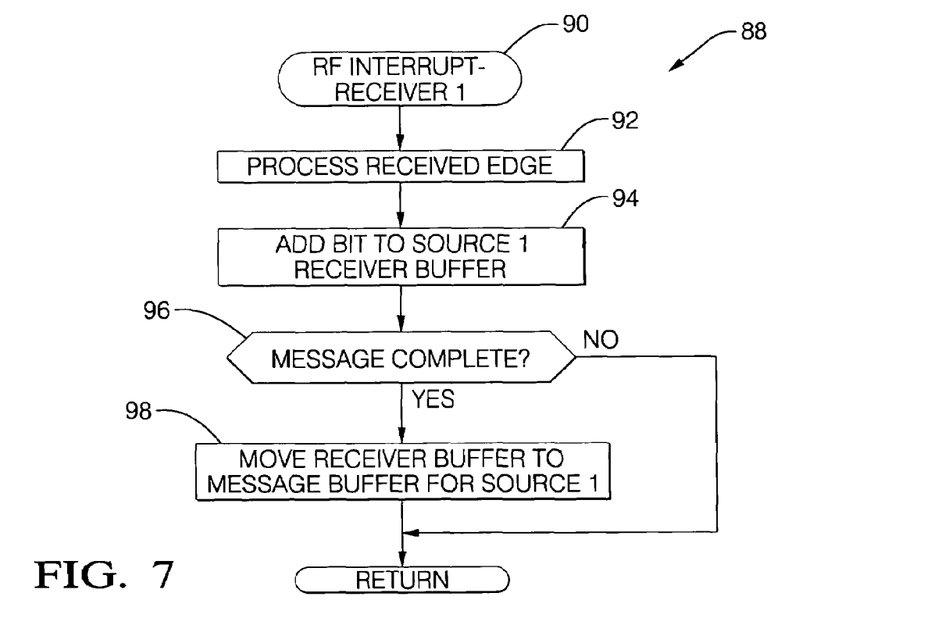
FIG. 7, is a flow diagram of a portion of a first alternative control circuit employing dual receivers, wherein a first receiver is coupled to its own dedicated antenna.
Figure 8:
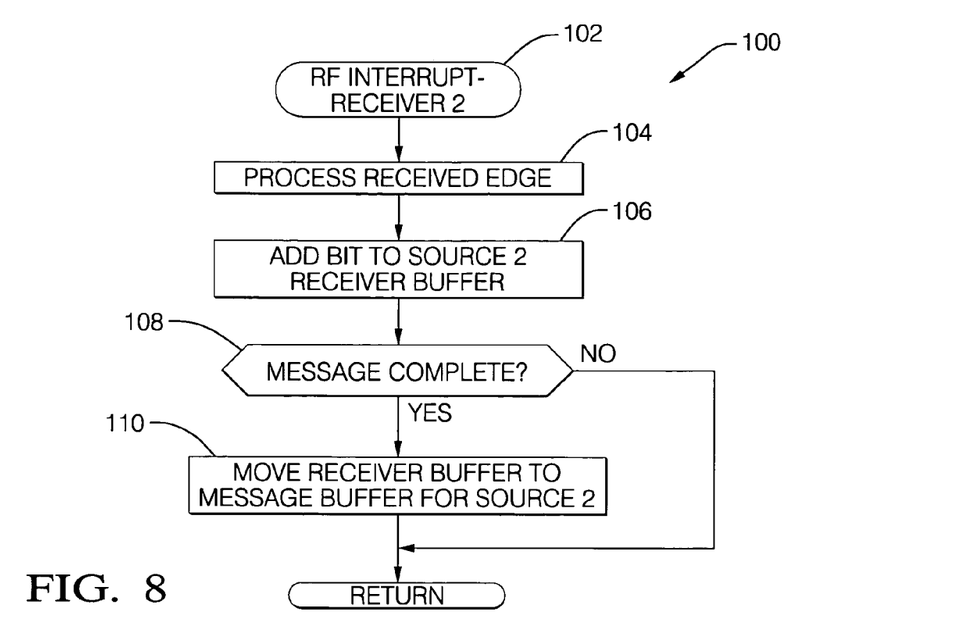
FIG. 8, is a flow diagram of another portion of the first alternative control circuit of FIG. 7, wherein a second receiver is coupled to its own dedicated antenna.
Figure 9:
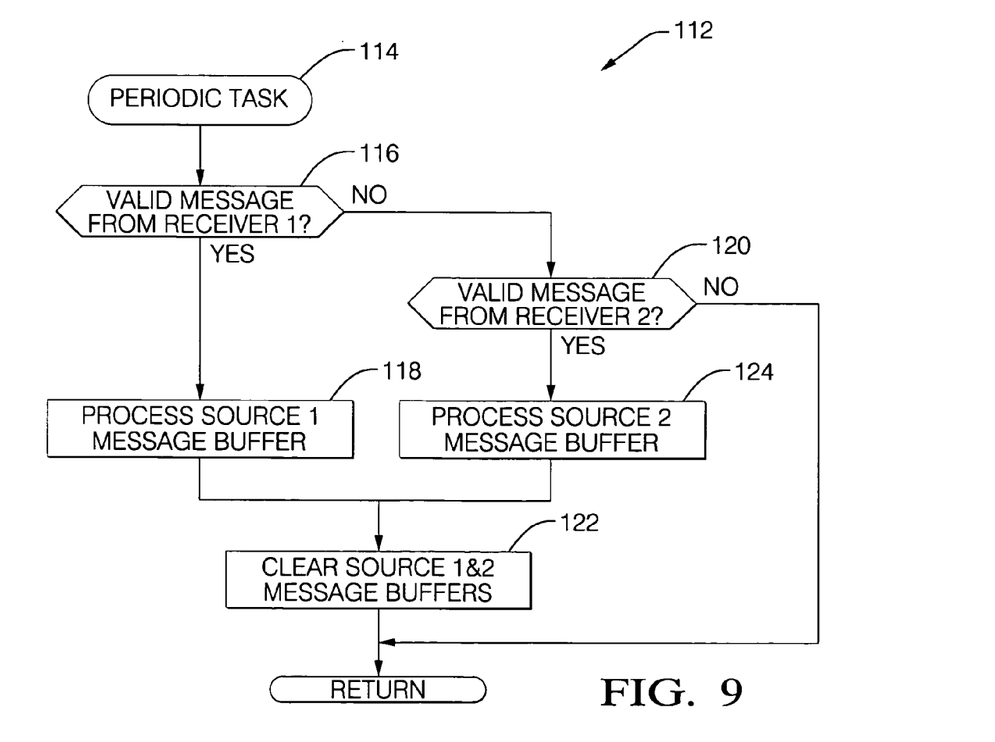
FIG. 9, is a flow diagram of another portion of the first alternative control circuit of FIGS. 7 and 8, wherein the first and second receiver outputs are compared to establish optimal antenna selection.

According to another embodiment of the invention, the received TPM signals can be received and processed by their own dedicated receivers. Restated, each antenna of the diversity system has its own dedicated receiver. FIGS. 7-9 illustrate the logic control of such a system in flow chart format. FIG. 7 illustrates a routine 88 wherein an RF interrupt is received at receiver 1 from its dedicated antenna at step 90. Control is transferred to step 92 wherein the received edge of the signal is processed. Thereafter, a bit is added to an associated source 1 receive buffer in step 94. A following decision step 96 determines whether the message is complete. If no, control is transferred back to step 90. If yes, control is forwarded to step 98 which effects movement of the contents of receive buffer 1 to a source 1 message buffer. Control is thereafter returned to initialization step 90.

Referring to FIG. 8, a routine 100 is depicted which largely replicates routine 88. Routine 100 illustrates where an RF interrupt is received at receiver 2 from its dedicated antenna at step 102. Control is transferred to step 104 wherein the received edge of the signal is processed. Thereafter, a bit is added to an associated source 2 receive buffer in step 106. A following decision step 108 determines whether the message is complete. In no, control is transferred back to step 102. If yes, control is forwarded to step 110 which effects movement of the contents of receive buffer 2 to a source 2 message buffer. Control is thereafter returned to initialization step 102.

Referring to FIG. 9, a routine 112, monitors messages received from receivers 1 & 2 from their respective antennas and processes messages contained in their respective message buffers. Beginning at initialization step 114, the routine 112 determines whether a valid message has been received from receiver 1 at decision step 116. If yes, control is transferred to step 118 wherein the message in the source 1 message buffer is processed. Thereafter, control is transferred to step 122 wherein source 1 message buffer is cleared and the routine is reinitialized at step 114. If the step 116 determination is no, control is transferred to another decision step 120 which determined whether a valid message has been received from receiver 2. If yes, control is transferred to step 124 wherein the message in the source 2 message buffer is processed. Thereafter, control is transferred to step 122 wherein source 2 message buffer is cleared and the routine is reinitialized at step 114.

The applicants note that a similar algorithm could be used with a single receiver with a switched input if the switching time and the microprocessor operation are fast enough.

The first alternative embodiment of the invention is also known as the dual receiver method. This method receives the messages from both antennas in parallel. It processes one receiver as the default and uses the other as a backup. There are obviously many ways to process this data.

This dual data can also potentially be utilized in combination to rebuild messages that neither antenna source received correctly.

According to a third embodiment, the received TPM signals provided at each output node 14a, 14b may be utilized in a switching TPM diversity system where the absolute signal levels are compared to each other to determine the most optimal receiving antenna of the TPM diversity antenna structure 14. As similarly described above, the TPM signals are transmitted through coaxial cable 20 which carries received AM/FM signals from output nodes 12a, 12b, 18.

Figure 10:
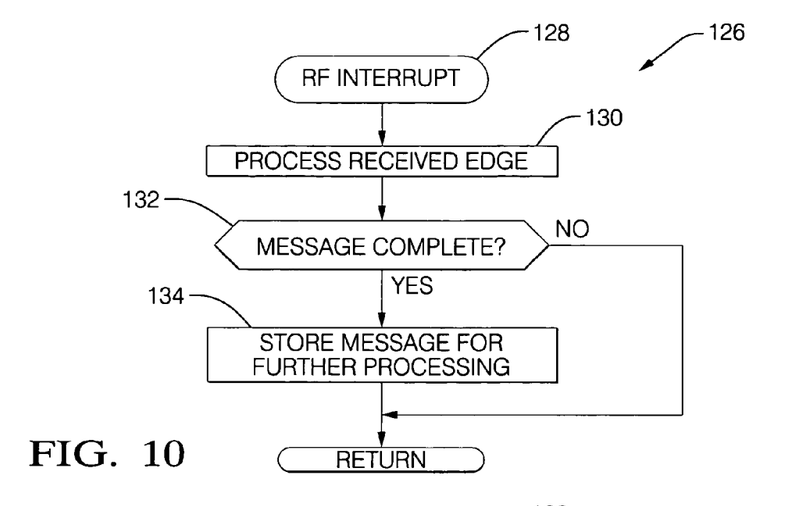
FIG. 10, is a flow diagram of a portion of a second alternative control circuit wherein execution time for decoding is employed to establish optimal antenna selection.
Figure 11:
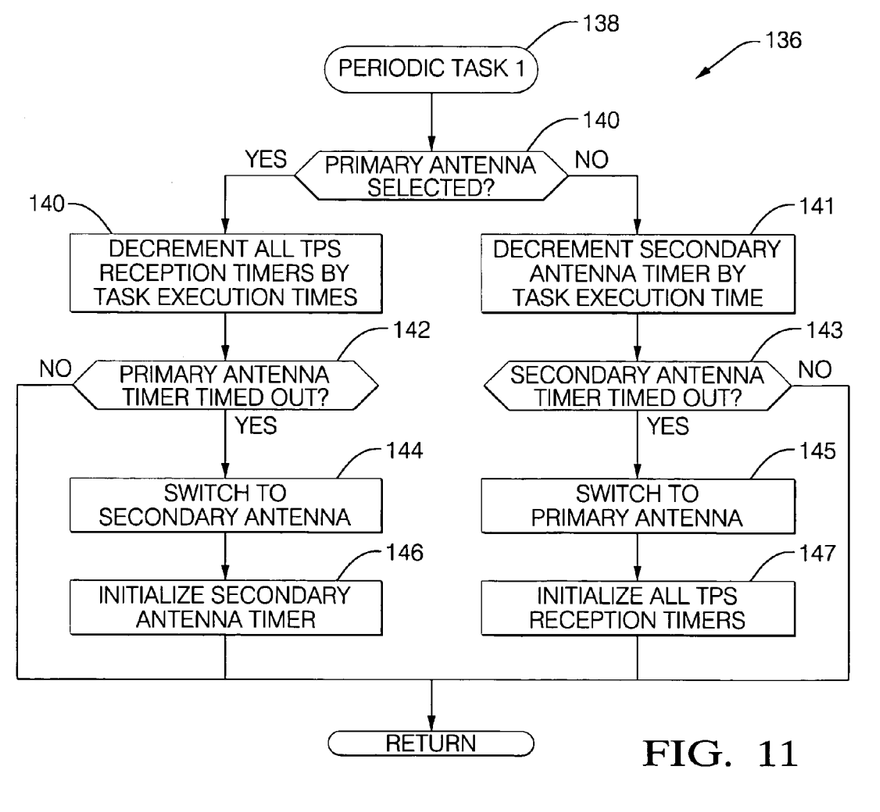
FIG. 11, is a flow diagram of another portion of the second alternative control circuit of FIG. 10, wherein antenna timers are decremented by task execution time.
Figure 12:
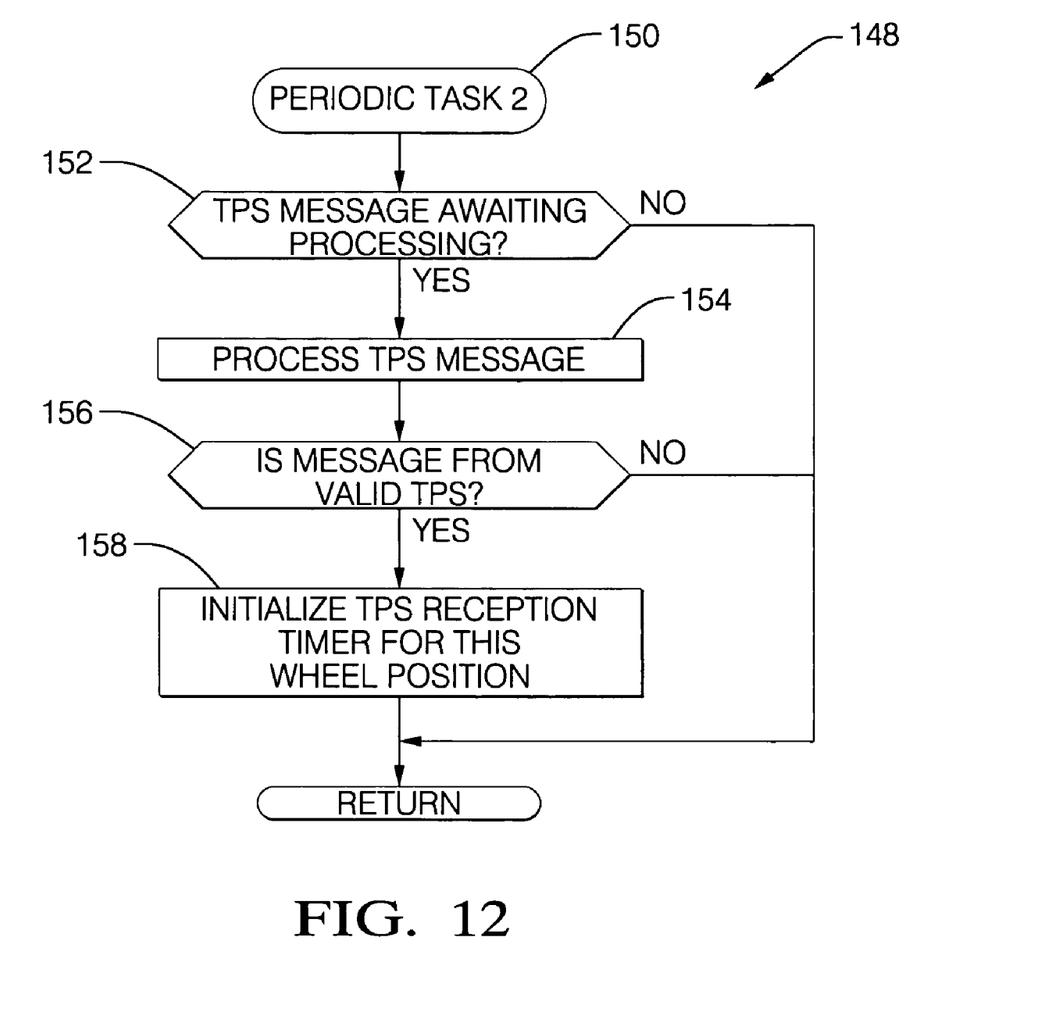
FIG. 12, is a flow diagram of another portion of the second alternative control circuit of FIG. 10, wherein antenna timers are decremented by task execution time.

Referring to FIGS. 10, 11 and 12, a tire pressure monitor with diversity antenna system based upon tire condition signal reception rate is illustrated. FIG. 10 depicts a routine 126 for establishing the time of receipt of a tire condition message. Routine 126 is initialized at an RF interrupt step 128 from which the received edge of the signal is processed at step 130. Control then flows to a decision step 132, which determines whether the message is complete. If yes, the message is stored for further processing at step 144 and the routine 126 is reinitialized by return of control to step 128.

Referring to FIG. 11, a routine 136 depicts a timing strategy wherein the primary antenna is initially selected and reception timers are at a maximum setting. Routine 136 is initialized at step 138. In a following decision step 139 the selection of the primary antenna is confirmed. If yes, all TPS reception timers are decremented by a previous task execution time at step 140. If no, the secondary antenna timer is decremented by a previous task execution time at step 141. If the primary antenna was initially selected, control from step 140 flows to decision step 142, which ascertains if any TPS timers have timed out. If yes, control flows to step 144 in which the RF source is switched to the secondary antenna. If no, control returns to initialization step 138. Following switching to the secondary antenna in step 144, the secondary antenna timer is initialized at step 146. If the primary antenna is not initially selected at decision step 139 and the secondary antenna timer is decremented by task execution time at step 141, control flows to decision step 143, which ascertains whether the secondary antenna has timed out. If yes, control flows to step 145 wherein the RF source is switched to the primary antenna. If no, control returns to initialization step 138. Following switching to the primary antenna at step 145, all TPS reception timers are initialized at step 147 and control returns to initialization step 138.

Referring to FIG. 12, a routine 148 controls tie initialization of the TPS reception timer associated with the wheel position, which is the source of a valid message. Following an initialization step 150, control flows to a decision step 152, which ascertains whether a TPS message is awaiting processing. If yes, control flows to a step 154 in which the TPS message is processed. If no, control is returned to initialization step 150. Following processing of a TPS message in step 154, control flows to decision step 156, which determines whether the TPS message is from a valid TPS. If yes, control flows to step 158 in which the TPS reception timer for the particular validated wheel position is initialized. If no, control is immediately returned to initialization step 150. Following the initialization of the specified TPS timer in step 158, control is returned to initialization step 150.

The alternative embodiment of FIGS. 10-12 is called the reception rate method. This method keeps a timer for each wheel position. The timers count down the time between consecutive messages fir each wheel position. If we are having difficulty receiving from one of the sensors, its timer will reach zero. We will then switch to the backup antenna for a predefined amount of time to attempt reception on that antenna.

The intent of this method is that the primary antenna is to be used for most if not all reception and the secondary antenna is only used as a backup. Since it is not necessary to receive all messages for the system to be successful, this prevents any of the timers from failsofting.

A typical system will have five (5) total timers: four (4) to keep track of each wheel sensor's reception while on the primary antenna, and one (1) to keep track of how long the secondary antenna has been used.

The tire pressure sensors employed in the present invention transmit in two modes, stationary and drive mode. There is an electromechanical (roll direct) switch that opens and closes based upon centrifugal acceleration. When the switch is open the sensor is in the stationary mode and transmits at a rate of 1/hr for conserving the battery. When the switch is closed, the sensor is in the drive mode and transmits at a rate of 1/min. Embedded in the RF transmission is a function code. The function code defines the roll switch state along with other states of the sensor.

The sensor also has the ability to transmit when the delta pressure threshold is determined. The sensor samples every 20 s in stationary mode and every 30 s in drive mode. If the delta pressure threshold is met, then the sensor will transmit immediately and not wait for the 1/hr or 1/min timers to expire. This is called repressure mode. The sensor has a range of 0-51 psi and a resolution of 0.2 psi/count. The delta threshold is 0.8 psi.

The sensor's RF transmission consists of a is block, which contains 8 words of repeated information. These 8 identical words are pseudo randomly spread over the 1 s to mitigate sensor RF transmission collisions in case sensors transmit at the same time Fault monitoring is performed by the RFA module. System faults only occur in drive mode. The particular set of parameters that have to be met for a fault to occur are:

Minimum fault speed—this value is calibratable in the module's flash memory or EEPROM such that the car plant or dealerships can change if needed. Currently, the value is set at 25 MPH. The vehicle speed must be greater that or equal to the minimum fault speed for fault monitoring to be active.

Maximum fault speed—this value is calibratable in the module's flash memory or EEPROM such that the car plant or dealerships can change if needed. Currently, the value is set at 110 MPH. The vehicle speed must be less than or equal to the maximum fault speed for a fault monitoring to be active.

Fault timer—this fault time is calibratable is the module's flash memory or EEPROM such that the car plant or dealerships can change if needed. There is a separate fault timer for each wheel position. Currently, the value is set at 10 minutes.

Fault monitoring is active when the vehicle is in the range of the min. and max. fault speeds. When these conditions are met, the fault timer(s) start to decrement. When a TPS transmission is successfully received, the fault timer for that wheel position is reset and then immediately starts to decrement as long as the fault monitoring conditions are met. If the vehicle speed goes below the min. fault speed or goes above the max. fault speed, the timer stops decrementing until it falls back in the range of min. to max. fault speed.

If the vehicle is stopped and the key position is changed (out of run), the fault timers will reset when entering run key position. If a fault is active and the key position is changed, this will not clear the fault. The only manner in which the fault will clear is by a successful receipt of an RF transmission from the faulted wheel position(s).

If the timer decrements to 0 for any of the fault timers, a system fault occurs. This will cause the message "Tire Pressure Monitor" to be displayed on the radio or cluster monitor. The pressure data for the faulted wheel position is cleared and dashes are displayed. This indicated a sensor issue, receiver issue or system issue. The system issue could be an interfering signal caused by another vehicle, onboard equipment, or from the environment. Any combination of wheel positions could be faulted sat a given time.

After a system fault occurs, if an RF transmission from the faulted wheel position(s) is received, the fault(s) is cleared, the timer(s) reset and the appropriate tire pressure data is updated and displayed. The timer would then start to decrement as long as the fault monitoring conditions are true.

With a single antenna for receiving TPS transmissions, there will exist wheel position(s) that will have weaker signals when compared to other wheel positions as seen by the receiver. Due to interference caused by the environment, onboard equipment both OEM and non-OEM, other vehicle sensors or TPS collisions, faults can be set. Until the interfering signal subsides, there exists the potential for faults to be ongoing depending on the frequency and strength of the signal.

With a combined RFA and FM diversity system, there are a minimum of two FM antennas in the vehicle. Typically, one of the FM antennas is collocated or combined with the RFA/TPS antenna. This leaves an additional FM antenna which is typically, located in the opposite side of the vehicle that can be used to improve receiving of weaker TPS signals. With sedans, one FM antenna would be in the front windshield and the other FM antenna would be in the backlite. For CUV/SUV typically, the rear quarter glass is utilized such that one FM antenna is in the right rear quarter glass and the second FM antenna is in the left rear quarter glass.

With the appropriate hardware added to the RFA module, multiple antenna inputs can be switched into the keyless entry/TPS filter section for decoding by the microprocessor. The RFA modules' microprocessor would control the switching between antennas based on an algorithm to maximize reception of the TPS signals while in fault monitoring mode. While in static mode, the RFA/TPS antenna would be utilized for maximum keyless entry range. Also, two RF receiver/front end could be utilized into separate channels of the microprocessor.

Comparison of the three embodiments:

Methods 1 and 2 require more hardware and are therefore more expensive. Method 1 needs signal strength measuring capability and the ability to selectively switch antenna feeds to the receiver.

Method 2 requires dual receivers and potentially a faster microcontroller to quickly process both messages.

Method 1 reacts real-time to switch the receiver to the antenna providing the strongest signal.

Method 2 reacts after-the-fact but since it has gathered the message from both antennas in parallel, it can afford top wait with no data loss.

Methods 1 and 2 are much more robust in that they do not miss any messages.

Method 3 adds no hardware so is the cheapest solution. However, it is not as robust since it uses message loss to select the source antenna after-the-fact. Unlike methods 1 and 2, it is just trying to prevent not getting any messages from some sensors. Although it still misses some messages, it should get enough to prevent any failsoft conditions to be evident to the vehicle operator.

present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basic constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. It is therefore, to be understood that within the scope of the appended claims, wherein reference numerals are merely for illustrative purposes and convenience and are not in any way limiting, the invention, which is defined by the following claims as interpreted according to the principles of patent law, including the Doctrine of Equivalents, may be practiced otherwise than is specifically described.

The invention claimed is:

1. An automotive tire pressure monitoring system comprising:
a primary antenna disposed adjacent a vehicle window;
a secondary antenna disposed adjacent a vehicle window distal said primary antenna:
a receiver;
switch means selectively coupling said primary and secondary antennas with said receiver;
a processor; and
a memory subsystem coupled to the processor, the memory subsystem storing code that when executed by the processor instructs the processor to perform the steps of:
connecting the primary antenna to the receiver;
detecting and measuring the strength of a message signal indicative of a vehicle tire condition received by the primary antenna;
calculating the signal to noise ratio for the primary antenna;
connecting the secondary antenna to the receiver;
detecting and measuring the strength of a message signal indicative of a vehicle tire condition received by the secondary antenna;
calculating the signal to noise ratio for the secondary antenna;
comparing the primary antenna signal to noise ratio with the secondary antenna signal to noise ratio;
connecting the antenna with the highest signal to noise ratio to the receiver;
processing the received signal; and
generating an output signal as a function of information contained in said received signal.

2. The automotive tire pressure monitoring system of claim 1, wherein the processor further performs the steps of:
determining that no message signal is being received;
measuring ambient noise with the primary antenna connected to the receiver;
storing a primary antenna based ambient noise value;
measuring ambient noise with the secondary antenna connected to the receiver; and
storing a secondary antenna based ambient noise value.

3. The automotive tire pressure monitoring system of claim 2, wherein the steps of determining and storing noise level signals are continuously repeated.

4. The automotive tire pressure monitoring system of claim 1 wherein at least one of said antennas is disposed adjacent and electromagnetically coupled to a radio antenna.

5. The automotive tire pressure monitoring system of claim 1, wherein at least one of said antennas is interconnected to a remote keyless entry system for said vehicle.

6. The automotive tire pressure monitoring system of claim 1, wherein each of said primary and secondary antennas comprise conductive traces configured in a generally L-shaped configuration.

7. The automotive tire pressure monitoring system of claim 1, wherein said primary and secondary antennas are asymmetrical.

8. The automotive tire pressure monitoring system of claim 1, wherein at least one of said antennas is co-formed with an AM/FM diversity antenna array.

9. The automotive tire pressure monitoring system of claim 1, wherein both of said antennas are co-formed with respective elements of AM/FM diversity antenna array.

10. The automotive tire pressure monitoring system of claim 1, wherein said primary and secondary antennas are carried by opposed side windows of said vehicle.

11. An automotive tire pressure monitoring system comprising:
a primary antenna disposed adjacent a vehicle window and coupled to a first receiver;
a second antenna disposed adjacent a vehicle window distal said primary antenna and coupled to a second receiver;
a processor coupled to said first and second receivers;
a memory subsystem coupled to the processor, the memory subsystem storing code that when executed by the processor instructs the processor to perform the steps of:
processing a message signal received by said first receiver via said first antenna;
storing said message signal in a first buffer;
processing said message signal received by said second receiver via said second antenna;
storing said message signal in a second buffer;
confirming that the message signal received by the first receiver is complete and, if complete, generating an output signal as a function of information contained in said first receiver message signal; and
upon confirming that the first receiver message signal in not complete, further confirming that the message signal received by the second receiver is complete and, if complete, generating an output signal as a function of information contained in said second receiver message signal.

12. The automotive tire pressure monitoring system of claim 11, wherein the processor further performs the step of:
clearing said buffers prior to receiving another message signal.

13. An automotive tire pressure monitoring system comprising:
a primary antenna disposed adjacent a vehicle window;
a secondary antenna disposed adjacent a vehicle window distal said primary antenna;
a receiver;
switch means selectively coupling said primary and secondary antennas with said receiver;
a processor;
a memory subsystem coupled to the processor, the memory subsystem storing code when executed by the processor instructs the processor to perform the steps of:
connecting the primary antenna to the receiver;
receiving, storing and timing the reception time of a message signal indicative of a vehicle tire condition;
connecting the secondary antenna to the receiver;
receiving, storing and timing said message;
comparing the reception times of said message signal via said primary and secondary antennas;
re-connecting the receiver with the antenna having the shortest reception time; and
generating an output signal as a function of information contained in said received signal.

14. An automotive tire pressure monitoring system comprising:
means for receiving tire condition signals from at least one wheel-mounted transmitter simultaneously via a plurality of spaced antennas fixedly disposed within a host vehicle, ranking said received signals as a function of predetermined criteria, generating an output signal indicative of a tire condition as a function of the highest ranked received signal, and transmitting said output signal to a host vehicle communication system,
wherein said predetermined criteria comprises an informationally complete signal associated with each antenna.

15. An automotive tire pressure monitoring system comprising:
means for receiving tire condition signals from at least one wheel-mounted transmitter simultaneously via a plurality of spaced antennas fixedly disposed within a host vehicle, ranking said received signals as a function of predetermined criteria, generating an output signal indicative of a tire condition as a function of the highest ranked received signal, and transmitting said output signal to a host vehicle communication system,
wherein said predetermined criteria comprises the rate of reception of successive signals associated with each antenna.

16. An automotive tire pressure monitoring system comprising:
means for receiving tire condition signals from at least one wheel-mounted transmitter simultaneously via a plurality of spaced antennas fixedly disposed within a host vehicle, ranking said received signals as a function of predetermined criteria, generating an output signal indicative of a tire condition as a function of the highest ranked received signal, and transmitting said output signal to a host vehicle communication system,
wherein said means for receiving tire condition signals comprises means for effecting parallel processing of said tire condition signals.

17. An automotive tire pressure monitoring system comprising:
means for receiving tire condition signals from at least one wheel-mounted transmitter simultaneously via a plurality of spaced antennas fixedly disposed within a host vehicle, ranking said received signals as a function of predetermined criteria, generating an output signal indicative of a tire condition as a function of the highest ranked received signal, and transmitting said output signal to a host vehicle communication system,
wherein said means for receiving tire condition signals comprises a receiver coupled to each of said antennas via a switch.

18. An automotive tire pressure monitoring system comprising:
means for receiving tire condition signals from at least one wheel-mounted transmitter simultaneously via a plurality of spaced antennas fixedly disposed within a host vehicle, ranking said received signals as a function of predetermined criteria, generating an output signal indicative of a tire condition as a function of the highest ranked received signal, and transmitting said output signal to a host vehicle communication system,
wherein said means for receiving tire condition signals comprises a separate receiver coupled to an associated antenna.

19. The automotive tire pressure monitoring system of claim 15, wherein said predetermined criteria comprises a measured signal to noise ratio associated with each antenna.

20. The automotive tire pressure monitoring system of claim 16, wherein said predetermined criteria comprises a measured signal to noise ratio associated with each antenna.

21. The automotive tire pressure monitoring system of claim 17, wherein said predetermined criteria comprises a measured signal to notice ratio associated with each antenna.

22. The automotive tire pressure monitoring system of claim 18, wherein said predetermined criteria comprises a measured signal to noise ratio associated with each antenna.

23. The automotive tire pressure monitoring system of claim 14, wherein said predetermined criteria comprises a measured signal to noise ratio associated with each antenna.

* * * * *